US008667518B2

(12) United States Patent
Kuijlaars

(10) Patent No.: US 8,667,518 B2
(45) Date of Patent: Mar. 4, 2014

(54) SYSTEM AND METHOD FOR PROVIDING CONTROLLED ACCESS

(75) Inventor: Erik Gerardus Adriaan Kuijlaars, Voorburg (NL)

(73) Assignee: Quadriga Worldwide Limited, Theale (GB)

( * ) Notice: Subject to any disclaimer, the term of this patent is extended or adjusted under 35 U.S.C. 154(b) by 744 days.

(21) Appl. No.: 12/263,700

(22) Filed: Nov. 3, 2008

(65) Prior Publication Data

US 2009/0119698 A1    May 7, 2009

Related U.S. Application Data

(60) Provisional application No. 60/985,098, filed on Nov. 2, 2007.

(51) Int. Cl.
*H04N 7/16* (2011.01)

(52) U.S. Cl.
USPC .......... 725/6; 725/25; 725/31; 726/9; 726/20; 380/229; 705/65; 705/66

(58) Field of Classification Search
USPC ....................................... 725/6, 25
See application file for complete search history.

(56) References Cited

U.S. PATENT DOCUMENTS

| | | | | |
|---|---|---|---|---|
| 4,358,672 A | * | 11/1982 | Hyatt et al. | 235/380 |
| 4,700,296 A | | 10/1987 | Palmer et al. | |
| 5,060,079 A | * | 10/1991 | Rufus-Isaacs | 725/29 |
| 5,465,113 A | | 11/1995 | Gilboy | |
| 5,521,631 A | | 5/1996 | Budow et al. | |
| 5,661,517 A | | 8/1997 | Budow et al. | |
| 5,726,645 A | | 3/1998 | Kamon et al. | |
| 6,069,672 A | * | 5/2000 | Claassen | 348/734 |
| 6,094,482 A | * | 7/2000 | Tajima et al. | 713/186 |
| 6,275,991 B1 | | 8/2001 | Erlin | |
| 6,336,729 B1 | | 1/2002 | Pavelle et al. | |
| 6,424,947 B1 | | 7/2002 | Tsuria et al. | |
| 6,476,825 B1 | | 11/2002 | Croy et al. | |
| 6,696,918 B2 | | 2/2004 | Kucharczyk et al. | |
| 6,781,923 B1 | | 8/2004 | Lizzi | |
| 6,831,570 B2 | | 12/2004 | Barile et al. | |
| 6,900,720 B2 | | 5/2005 | Denison et al. | |
| 7,012,503 B2 | | 3/2006 | Nielsen | |
| 7,620,813 B2 | * | 11/2009 | Park et al. | 713/169 |
| 7,639,156 B2 | | 12/2009 | Kuijlaars | |
| 7,812,738 B2 | | 10/2010 | Kuijlaars | |

(Continued)

FOREIGN PATENT DOCUMENTS

EP    1009165 A1    6/2000

OTHER PUBLICATIONS

European Search Report 07798172.8-2223/2038711 PCT/US2007070512, dated Sep. 11, 2011.

*Primary Examiner* — Robert Hance

(74) *Attorney, Agent, or Firm* — Finnegan, Henderson, Farabow, Garrett & Dunner, LLP

(57) ABSTRACT

A method for operating a signal receiver which authorizes controlled access, comprising providing an authentication token device having a predetermined usage limit stored therein, providing a reading device for reading the authentication token device, and for implementing the predetermined usage limit while deauthorizing the authentication token device for use with other reading devices, comprising a signal generator for communicating with a signal receiver through a wireless transmission, receiving the wireless transmission at the signal receiver, to permit access based on the received transmission, and upon exceeding the predetermined usage limit, deauthorizing further access.

23 Claims, 2 Drawing Sheets

(56) References Cited

U.S. PATENT DOCUMENTS

| | | |
|---|---|---|
| 7,821,395 B2 | 10/2010 | Denison et al. |
| 8,009,015 B2 | 8/2011 | Sayers et al. |
| 2001/0009039 A1* | 7/2001 | Hayes et al. .................. 725/133 |
| 2005/0285716 A1 | 12/2005 | Denison et al. |
| 2006/0055554 A1 | 3/2006 | Hayes et al. |
| 2007/0074273 A1* | 3/2007 | Linden .............................. 726/3 |

\* cited by examiner

SYSTEM AND METHOD FOR PROVIDING CONTROLLED ACCESS

FIELD OF THE INVENTION

The present invention relates to the field of remote controls for electronic devices for presenting content.

BACKGROUND OF THE INVENTION

Remote control systems, including devices with a signal generator and a signal receiver for providing controlled access to information and/or communication channels, whereby signal generator and signal receiver are set to transmit and receive an infra-red signal or radio signal, respectively, and the signal receiver is set to provide access to the information and/or communication channels on receiving the signal, are known. Suitable information and/or communication channels include the entire range of radio, television, film channels and video channels, plus all possible data channels. Remote controls are also known for toys, computers, consumer electronics, automobiles, etc.

Such a device is in itself known and is widely used in combination with providing paid access to television channels or film channels in hotel rooms, for example. By using an appropriate computer system, it is possible to monitor how long and which television and/or film channels are watched and whether an Internet connection is used, for example. Besides the fact that such systems are particularly expensive, the disadvantage of such a system for the hotel guest is that his/her privacy can easily be invaded. In particular, the log of hotel guest activities may be an invasion of privacy, and the distribution of that log as part of a bill problematic.

Another known, simpler system allows the hotel guest to rent an operating unit when he/she registers at the hotel reception desk, and provides the hotel guest access to the available information and communication channels during his/her stay. Such a system has the disadvantage that careful administration has to be kept of who has been provided with such an operating unit, whether the operating unit has been returned and whether it has actually been paid for. The transport of the unit also opens it to possible theft or damage.

Micropayment technologies are known which allow, using cryptographic security, a reasonably secure payment to be made without requiring real-time verification. Some of these technologies also allow re-spending of received value. See, e.g., U.S. Pat. No. 5,999,919 expressly incorporated herein by reference. See also Rivest and Shamir, "PayWord and MicroMint: Two Simple Micropayment Schemes" (May 7, 1996), all of which are expressly incorporated herein by reference.

Rolling code technologies provide a method for cryptographically communicating using a cryptographic scheme which changes with use or time. The encryption key seed and decryption key seed each advance incrementally and a re kept in synchronization. Thus defeats replay attacks, since old messages no longer have the proper cryptographic properties. See, e.g., U.S. Pat. Nos. 7,050,947; 6,980,655; 6,900,720; 6,882,729; 6,810,123; 6,690,796; 6,323,566; 6,249,582; 6,225,889; 6,194,991; 6,154,544; 6,078,271; 6,046,680; 6,028,527, each of which is expressly incorporated herein by reference.

Challenge Response technologies require a two-way communication between two systems which seek to communicate. Typically, one system seeks to authenticate the other, but the technology is also capable of authenticating both systems to each other. DTCP (content protection for IEEE-1394) employ such technologies. See, e.g., U.S. Pat. Nos. 7,051, 212; 7,025,209; 7,010,692; 6,981,145; 6,850,252; 6,792,533; 6,640,304; 6,607,136; 6,427,140, expressly incorporated herein by reference.

SUMMARY OF THE INVENTION

The present invention is intended to provide a system with which the above disadvantages of these known systems can be overcome. Correspondingly, according to the invention, the wireless signal generator will be set to transmit an encoded signal which limits a number of times a service may be operated and/or a time period over which such services may be operated.

For example, a hotel guest may wish to acquire the right to view a block of premium channels in a hotel room for viewing over the course of a limited stay, without that transaction appearing on the hotel bill. The guest acquires an encoded device or an activation token for a device, which carries with it the right to activating the premium service, but cannot be used more that the predetermined limit. The device or token can preferably be transferred without identification of the acquirer, and thus the acquisition of that device may be anonymous. Likewise, the use of that device may be self-authenticating, and therefore detailed logs need not be maintained or analyzed for real-time billing purposes. The controlled device may maintain a log of devices used to activate it, for example indicating an identifying code for the activating device and the date of activation. These may later be uploaded to a database, and used to ensure that the individual device identifiers have not been duplicated, or that unauthorized device identifiers were used. Duplicated or unauthorized device identifiers may then be subject to an authority revocation or blocking, prevent use of "cloned" or counterfeit devices.

As an adjunct, in the case of an activation card, which may be similar to a cell phone SIM card, the remote control device which receives the card may also be encoded with an identifier, which, for example, is linked only to the receiver locating in the room. Therefore, the remote control device is only usable in the specified room, making theft of these devices less attractive.

In order to ensure that an activation card is used in only one location, the controlled device, e.g., a television or set top box, provides a communication channel to the remote control device. For example, the television or set top box may emit an encoded radio frequency transmission every 10 seconds, which is received by the remote control. If the remote control misses, for example, 100 seconds of transmissions, it automatically deactivates itself or the activation token associated with it, so that the activation function would not work in any other location. The transmission may be, for example, a 330 MHz, 450 MHz, 900 MHz, 2.4 GHz, or 5.8 GHz transmission in an ISM band, employing a rolling code transmission, and containing information identifying the activation identifier. The remote control device receives the transmission, and compares the activation identifier in the transmission with the actual activation identifier of the remote control or activation token. If it does not match, or no code is received within a preset period, the activation capacity of the remote control or token is revoked. In order to save power, the remote control receiver may go into a sleep mode immediately after receiving a signal for a preset duration, and awake just before the next scheduled transmission. Since transmissions may pass through walls and thus a remote control may be subject to signals from many receivers, the receivers may employ a self-synchronization function to avoid mutual interference.

Likewise, if a remote device receives both a proper signal and improper signals, the proper signal overrides.

In case of the use of an activation token, after insertion in a remote control having a slot for receiving the card, the token may be reprogrammed so that it will not work in any other remote control. Alternately, when the token is inserted in the remote control, its authorization may be transferred from the token to volatile storage within the remote control, and the token itself invalidated. In this later case, it is possible to have multiple concurrent authorization tokens active without being physically present in the remote control. In any case, once initially activated, the limited use restriction of the token are initiated.

In accordance with some embodiments of the invention, there may be multiple channels or blocks of channels which may be selectively activated through the remote control. For example, adult channels, sports channels, movie channels, etc. may represent separate rights to be acquired. Advantageously, the remote control or activation token may itself encode for these authorizations separately. Therefore, at the time of purchase (point of sale), or acquisition, the particular blocks of channels may be selected. Typically, this selection will occur by acquisition of a device or token preprogrammed for the particular block(s) of channels, though it may be possible to program the remote control or authorization token at the time of acquisition for the particular block(s) of channels authorized.

The remote control or authorization token can be used in case of TV rental, that is, not for limiting access to certain channels, but for authorization of all channels. Thus, for example, a hospital patient may obtain television service by acquiring a remote control device or authorization token, to permit use of the television device. The authorization token need be inserted into the remote control, but may be inserted into the receiver itself. Indeed, some receivers have "card slots" such as SD, and the functionality may be implemented in an SD compatible card.

According to an embodiment of the present invention, the signal generator will be set to transmit a predetermined signal comprising simultaneous transmission of two or more different codes once only or for a previously-determined time, to a programmed signal receiver, e.g., in a hotel television, which is able to accept these codes simultaneously and provides direct access to the available information and communication channels.

For example, the Philips iTV platform is capable of receiving multiple signals simultaneously. The use of the simultaneously transmitted signals discourages and makes difficult the use of signal recording devices to replay the signal, and thus permit unauthorized use of the programmed signal receiver. Of course, this technique can only be used in conjunction with signal receivers which simultaneously receive the signals for processing.

Using modern hotel-type televisions, for example available from Philips Electronics (Eindhoven NL) the receiver may be upgraded with software or firmware which responds to a proprietary set of commands from the remote control device. For example, a series of four encoded commands (in addition to any authentication information which may be desired) is communicated from the remote control device to the receiver, for example by way of an infrared beam transmission. The four commands may be, for example, "go to ring"; "open channel"; "up/down"; and "close ring". The "ring" is the set of channels which are selectively available to a user in possession of the authentic remote control or activation token. Based on the set of commands, a relatively simple remote control device can access the substantial set of functions required.

Thus, for example, most hotel televisions manufactured after 2003 can be upgraded through firmware modification of the flash memory to incorporate many functions described herein, without interfering with existing functionality. The additional functions are referred to as the Smoovie® mode, which are otherwise unavailable from a regular remote control without the proprietary functions or capabilities. When the Smoovie® mode is activated, there will be an extra range of channels available, that can only be opened when the receiver receives the proper sequence of codes and associated authentication information.

One embodiment of the invention therefore provides a signal generator embodied as a disposable product in the form of a small remote control with volume (up and down) and channel (up and down) buttons, that can only be used once or for a limited period. This has the advantage that no administration at all has to be kept, and that there is absolutely no invasion of the hotel guest's privacy. The fact that the signal generator according to this embodiment of the present invention transmits a predetermined signal of two or more different codes once, to a programmed signal receiver in the hotel television, makes it difficult or impossible to access the available information and communication channels otherwise.

According to one embodiment, a physical limitation is placed on the transmitter which prevents substantial use outside of predetermined parameters. In order to permit the signal generator be suited for limited usage, one method is to limit the time during which the previously-determined signal is capable of being transmitted, to a short period required to control the signal receiver within the scope of intended or authorized usage. For example, a single usage activation device may be provided. Here, account may be taken of the fact that the signal generator must be properly set and that the hotel guest is not acquainted with its specific equipment and set-up. The time the device is operational will therefore be in the order of several seconds to several minutes and more preferably in the order of 10 to 60 seconds. In practical tests, an operational time of 25 to 35 seconds appeared to be amply sufficient. That is, a single use device is operable only for a few seconds, and thereafter is inoperative. During that limited time, it performs its necessary functions. In some cases, the exhaustion of the battery may also act to erase a volatile memory which stores the authorization information, thus preventing replacement of the battery and reactivation of the device. In that case, the authorization information may be stored in a battery-backed random access memory, and when the device is activated, a much larger draw on the battery initiated to activate the transmitter, which may continue until the battery is exhausted. The battery, for example may be a thin film structure, and thus may be integrated with a memory card device.

According to one embodiment, the signal generator is provided with a signal source for generating two or more codes simultaneously, a power source and a contact switch for the connection of the power source, whereby the capacity of the power source is such that the predetermined signal can be transmitted for the predetermined time. With this embodiment, the time is determined by the capacity of the power source and the power consumption of the signal generator and remainder of the device. If the signal generator has a variable power consumption, it is also possible to provide a constant load across the power source after activation, which will drain the power source after a predetermined period of time.

Although the available usage time can be reasonably determined with such a circuit, it is possible that a signal generator that has been in stock for a long time will have a reduced power source capacity such that the available operating time is insufficient. It is therefore preferable to have an embodiment whereby the signal generator is provided with a power source, a contact switch and a programmable integrated circuit, whereby the predetermined signal to be transmitted and the time that the signal is to be transmitted are programmed. Here, there is a provision that the program included in the programmable integrated circuit is triggered by the first closing of the switch.

With such an embodiment, the time that the signal is transmitted can be determined quite precisely in the software, and the time does not generally depend on a power source capacity (which may have a surplus) that is not exactly known.

In order to ensure that the signal generator can no longer be used after the programmed time has expired, another embodiment provides a means for interrupting the signal, by using the program. Instead of interrupting the signal, the program can be so set that the signal of two or more codes transmitted is changed and is not recognized by the signal receiver. In both cases, reuse of the signal generator for its original purpose is in fact no longer possible. This can be improved on by providing that running through the program ends with the total deletion of the relevant program data, that is, the program data is stored in volatile memory which is modified during execution. Thus, another type of security may be provided, or triggering of a fuse to permanently inactivate the device or make functions inaccessible. For example, premium channels may be limited to a set duration, while other functions, such as volume, and non-premium channels, may be accessible without restriction. Indeed, this embodiment permits a pre-purchase of pay per view content, activated by a pressing a button on the device, and which after a predetermined number of presses, becomes exhausted.

An embodiment of the invention may therefore provide the signal generator with a power source (such as an electrochemical battery, zinc-air battery, capacitor, or fuel cell), a contact switch and a programmable integrated circuit, whereby the previously-determined signal to be transmitted and the time that the signal is to be transmitted are programmed. Here, there is a provision that the program included in the programmable integrated circuit is triggered by the first initiation of contact of the switch. This embodiment is generally consistent with a relatively simple device which transmits a static identification code which directly authorizes the receiver, rather than an embodiment wherein the management system receives a signal from the device, through the receiver, and then authorizes usage.

Furthermore, the device can preferably be provided with a contact that can be set from an unconnected state to a connected state once only for the connection of the circuit to the power source. As a result, the power source can be kept at sufficient capacity as long as possible and undesired signal generator operation can be prevented. As an alternate to the contact, advantageously a zinc-air battery is employed, which is activated by exposing the cell to air by removing a barrier. Once this electrochemical reaction starts, it will typically exhaust the battery over a relatively short period.

Besides the device with signal generator and signal receiver, the present invention also relates specifically to the signal generator itself, whereby the signal generator comprises a housing that accommodates a programmable integrated circuit, a power source, a control to transmit the programmed signal (e.g., comprising a plurality of simultaneously transmitted components) and a switch to start the program that is saved in the integrated circuit. Here, the signal generator is preferably further provided with a removable interrupter in the connection of the power source to the integrated circuit.

It should be clear that the signal generator according to an embodiment of the invention can be offered in many different ways because it is a disposable (throw-away) product for once-only use that cannot inherently be administratively connected to the user in any way. This is an important aspect of this embodiment of the invention, and its use as such with offering the signal generator is therefore part of the invention.

The invention also provides a method for marketing the signal generator that is mainly characterised by offering the signal generator through free sales channels, e.g., at no immediate cost to the user. According to another embodiment, the signal generator is offered for sale through a vending machine. Here, one can think of a vending machine for sweets and soft drinks, with one segment of the vending machine being reserved for an array of signal generators, for example. In this way, the signal generator is offered for sale completely anonymously and the consumer can buy a signal generator at any desired moment.

Besides this, the signal generator can also be offered for sale at a hotel desk or in a minibar in a hotel room. In this way, it is known that a hotel guest has bought a signal generator; however, his/her privacy is still generally preserved with regard to his/her viewing and listening behaviour.

The method according to the invention further provides the possibility of offering the signal generator as a promotional product. Here, we can think of travel agencies or other companies in service industries allied to the hotel, such as car hire companies and restaurants.

Finally, the method according to the invention also provides the possibility that the signal generator can carry one or more advertising slogans. Besides being able to put logos and brand names on the signal generator, it is equally possible to make the external appearance of the signal generator such that it (largely) corresponds with the product or logo design of the company making the advertisement.

According to another embodiment, the device presents a self-authenticating signal, which changes dynamically, and is not subject to replay attacks, since devices can be created to capture infrared or RF signals and reproduce these identically. Thus, once a signal sequence is employed, that particular sequence must be deauthorized for future use. In the case of a limited time signal, two particular options are preferred. First, a rolling code algorithm may be employed, in which each use of the device resets the code (and the corresponding authentication of the next transmitted code). Such rolling codes are well known in the art. A rolling code system may thus be implemented which provides secure authentication and communication of a message, and which is immune to replay attacks. This requires synchronization between the transmitter and receiver, which may be achieved by providing, for example, a photodiode (or may employ the normally transmissive LED as a photodiode) in the device which receives an optical signal from a television screen.

According to another embodiment, a micropayment system is implemented in which "credits" stored in the device are transferred to the device to be controlled through a cryptographically secure means. Thus, the transmitter device includes prepaid credits which are then spent during the course of communications with the device to be controlled, e.g., a set top box or television. A micropayment is transferable, and relatively anonymous, since the value is verified principally through cryptographic means. Means may also provided to ensure that the same credit is not transferred twice from the same (or counterfeit) source.

While many aspects of the present invention obviate the need for a real-time accounting and management system, in some cases this may be employed. Typically, the accounting and management systems communicate in a real-time with a facility management system, such as is provided by On Command Corporation, Denver Colo. Thus, a predetermined and/or cryptographically defined code may be communicated from the device, received by a set top box or other receiver, and communicated to a management system for authentication. Since, in a preferred embodiment, the device is permitted prepaid usage, and is anonymous, the management system authenticates that the device transmits an appropriate code, and either itself contains usage restrictions, or the usage restrictions are imposed by a database indexed by the device identification. After authentication, it is not necessary to link a certain transmitter device to a particular receiver, and thus anonymous statistics may be maintained for auditing, etc.

One way to provide self-authentication without need for remote management is a challenge-response algorithm. For example, the device may include a photodiode receiver (or indeed, may employ the same light emitting diode as used for transmission as a photodiode element, see www.sensorsynergy.com/helpfulhints.htm) which reads optical data transmitted from a television screen. This "challenge" signal is then processed in the device according to a secret algorithm, to produce a "response" signal to the receiver. The receiver then compares the received "response" to the anticipated "response" based on the challenge, and thus authenticates the secret algorithm. This algorithm, in turn, may be stored in tamper-resistant, volatile memory, and thus the "secret" protected. Further, the algorithm may be periodically updated in both the receivers and devices, limiting the harm if the secret becomes breached. See Challenge Response security references cited above, each of which is expressly incorporated herein by reference.

The single use only character of a preferred embodiment of the signal generator according to the present invention that makes it a particularly attractive commercial product in many aspects.

Another embodiment of the invention provides a relatively full-function remote control with a durable power source, which is not constrained in its use by power supply. Thus, the device may provide sufficient power for normal operation over 1, 4, 7, or 14 days, or longer. In this case, restrictions are imposed logically, rather than physically. For example, a timer or clock may be provided within the device to determine when it is first activated, and provide a set of functionality dependent on that time. The device is normally activated by removing a battery insulator, though it can be activated by an electronic signal or the like. For example, it may be desired to limit the use of the device for a period after distribution. Thus, the device may be activated upon distribution, for example by separation from a carrier, and then operate for 1, 4 or 7 days thereafter. Alternately, the device may be activated upon or in conjunction with its first use.

The invention may also be implemented using a smart card or other information carrier which is supplied to a persistent device, such as a remote control or a set top box. For example, a smart card control processor such as the µT82SCN30 from Microtech Innovation Limited may be used, in a card carrier 5×2.3 cm. For example, a remote control device is provided with a card reader, which may be a smart card (i.e., a thin carrier device with an electrical connector or electromagnetic communication interface between a secure processor embedded within the carrier), optically or magnetically encoded pattern, or otherwise having a readable code which is reasonably authenticatable and counterfeit resistant, which is read by the device. The information on the carrier activates all or a portion of the functions available through the remote control or set top box, thus alleviating the need for remote access control and permitting broadcast of the program material to the receiver without implementing selective access technologies for all channels, and thus not requiring external communication of the identification of the program material in some cases. The carrier may be sized similarly to a credit card, though other form factors may be usable, such as SD or mini-SD memory cards, SIM cards, CF, XD, or other known form factors. The remote control may be similar in form factor to existing remote controls, e.g., sized to be held and activated with a single child or adult human hand.

The function of the card is, for example, to securely activate a timer, which may be implemented in a smart card in the carrier or within the remote (or in the set top box) to watch premium programming such as pay-tv, for a limited time, and thereafter restrict viewing or tuning or program selection.

The system therefore supports a business model in which the information carrier authorizes a predetermined time of viewing, without providing any persistent association of an identification of the viewer and the content being viewed, and thereby ensuring privacy.

According to one embodiment, an accounting system may be supported which automatically activates and accounts for the card when first used. This, for example, requires sending a signal from the carrier, through the remote control, to the receiver, and hence to a remote server. This scheme, while adding a level of complexity to the infrastructure, permits compensation for the carrier based on actual usage, and compensation of the content owners of pay-per-view programming based on actual viewing. This extended infrastructure, which is not generally required by other embodiments of the invention, may be used to ensure that the carriers are authentic and properly paid for, since duplicate usage or spurious authentication requests could be readily identified. For example, a vendor of a carrier may be charged for the inventory only as the carrier is used, and therefore wide distribution of the carriers to many vendors is encouraged. Such accounting may be accomplished by communicating to a central server the identification of a carrier when it is first employed, or each time it is employed, to then bill the account of the seller. Assuming that the carrier itself is acquired anonymously, and the set top box does not reveal the information presented, privacy is preserved. However, an encrypted or secure identification or identification protocol may be provided as necessary to ensure system security, protected from availability under normal circumstances.

In other embodiments, the carrier which operates in conjunction with a durable remote control, or a disposable remote control device, directly activate and control the media device, e.g., television, and do not necessarily interact with other remote systems, thus permitting compensation for the activation of the programming services without diminishing privacy by explicitly identifying the programming services on a hotel bill or by linking a room number with the programming presented. Circumvention resistance is typically obtained by using a non-ubiquitous communication protocol between the remote control and the media device, and therefore preventing use of unauthorized third party remote controls that circumvent limitations. Counterfeiting resistance may be obtained cryptographically or by employing proprietary electronics. Thus, in such embodiments, for example, a remote control device having a smart card or SIM slot receives the smart card or SIM (subscriber identity module), which can be sold, for example, in the form of a credit card, though typically the operative portion is detached from a plastic carrier prior to use to permit a smaller form factor. The remote control is activated by insertion of the information carrier (e.g., activation card).

According to a preferred embodiment, a remote control device has an internal clock which imposes a time limitation for authorization of an activation token, such as a smart card or SIM. The clock runs off of the battery in the remote control, but is also run from a capacitor or ultracapacitor so that removal of the batteries does not interrupt the timing function. After the card is inserted, the timer commences, and the identifier of the token is stored in the remote control, and the card is deactivated for use in another remote control. After the timer expires, the remote control will not longer operate from that token.

An embodiment therefore provides a remote control device, comprising a housing having at least one user interface control inputs, a self-contained power source, a transmitter adapted to transmit a remote control signal corresponding to an activation of the at least one user interface control input, and a detachable authorization information carrier, wherein a non-consumed detachable authorization information carrier provides authorization for a limited quantity of usage, which is consumed by such use, and wherein a consumed detachable authorization information carrier does not provide authorization for usage. The detachable authorization information carrier may comprises a smart card. The detachable authorization information carrier may be consumed, for example, by an alteration of electronically stored information therein. The detachable authorization information carrier may comprise a cryptographic information processor and an electronic memory. The quantity of use may comprise a predetermined duration and/or a predetermined number of uses. The transmitter may comprise at least one modulated infrared optical signal generator. The detachable authorization information carrier may be authenticated by a process comprising receiving a challenge signal from a processor in the housing, processing the challenge signal in the detachable authorization information carrier according to a secret algorithm to produce a response signal, transmitting the response signal to the processor to be controlled with an usage limitation, authenticating the response signal and usage limitation in the processor, and selectively activating the transmitter in accordance with the usage limitation, wherein the usage limitations represents a prepaid compensation for controlled access to a device to be controlled by the transmitter.

The device may be multifunctional, and for example, serve as a complete or supplemental remote control for a device, such as a video tuner. For example, the device may include buttons for volume control (±), channel (up/down), on/off, mute, etc. The device, for example, may be programmed to provide a set of activations for premium programming, i.e., pay per view. Thus, the device may have a button for activating a pay per view channel or premium TV channels. The device may be preprogrammed to provide a limited number or duration of such activations. Thus, billing for such programs need not appear on a hotel bill, for example, since the accounting is separate and prepaid.

The present invention therefore provides a relatively anonymous method for prepaid authorization of functioning of an electronic system, which avoids the need for an express accounting log of usage to verify charges. Thus, user privacy is enhanced. The system does not require modifications to be made in the existing television distribution network of a hotel.

BRIEF DESCRIPTION OF THE DRAWINGS

The invention will now be further elucidated on the basis of the example given in the drawings, where.

DETAILED DESCRIPTION OF THE PREFERRED EMBODIMENTS

Figure 1:
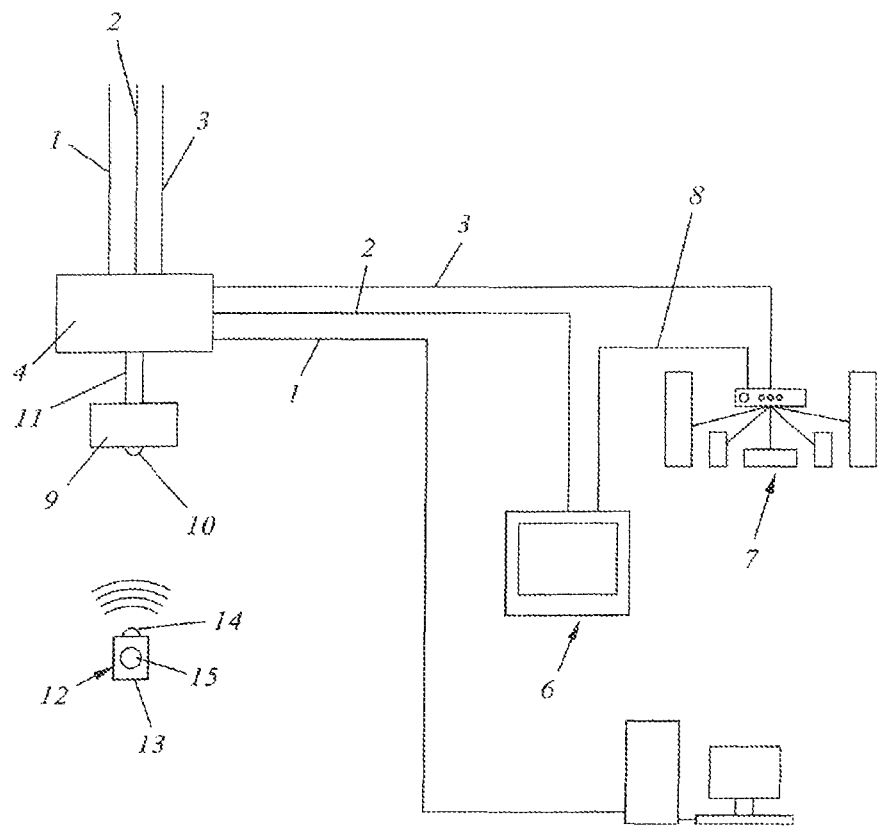
FIG. 1 shows a schematic diagram of a device having a signal generator and signal receiver according to the present invention.

FIG. 1 shows a schematic diagram of an embodiment in which an interruption and/or distortion unit 4 is included in a number of incoming channels 1, 2 and 3. It is not unusual, especially with television channels, to distort only the channels that are not allowed to be seen, while leaving the other channels viewable. Other channels, e.g. data channels such as Internet connections, can easily be selected for connection.

In the example given, channels 1, 2 and 3 are a data channel 1 with a computer 5 connected to it or to be connected to it, a television channel 2 with television receiver 6 and a separate audio channel 3 with audio installation 7. Audio installation 7 can be connected to television set 6 by connection 0, so that it is also possible to play DVDs.

With interruption and/or distortion unit 4, connections 11 connect a receiving device 9 to a signal receiver 10. Receiving device 9 and signal receiver 10 are set to receive and detect a previously-determined simultaneously plurality of transmitted infra-red signals and/or radio signals. These previously-determined optical (typically infra-red) signals and/or radio signals are transmitted by signal generator 12. The signal generator 12 may therefore be a set of infrared light emitting diodes (which may differ in location or orientation, optical wavelength, polarization, etc.), and/or radio frequency transmitters (e.g., ITU unregulated frequencies, including, for example, 6765-6795 kHz, 433.05-434.79 MHz 61-61.5 GHz, 13,553-13,567 kHz, 26,957-27,283 kHz, 40.66-40.70 MHz 902-928 MHz, 2,400-2,500 MHz, 5,725-5,875 MHz and 24-24.25 GHz). While typically, a single modality of communication is used, it is possible to have both infrared transmitters and RF transmitters active.

In the example given, signal generator 12 comprises a housing 13, a plurality of LEDs 14 that transmit a plurality of optical signals, and a push-button switch that can be used to transmit the signal. It is noted that the LEDs 14 may be housed in a single optical package, similar or identical to tricolour (R/G) or full color R/G/B LED modules.

Figure 2:
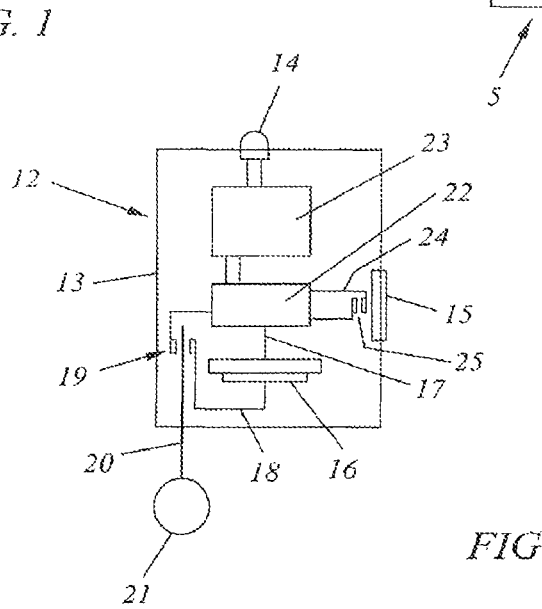
FIG. 2 shows the signal generator according to FIG. 1 schematically in more detail.

FIG. 2 shows signal generator 12 schematically in more detail. In housing 13, there is a battery 16 in the form of a button cell, which supplies the whole circuit. Connections 17 and 18 connect battery 16 to a programmable integrated circuit 22. Connection 18 includes a spring-loaded set of contact points 19, interrupted by a non-conducting strip 20. Strip 20 is provided with a grip 21, to which the strip can be extended between contact points 19. Integrated circuit 22 is further connected to LEDs 14 by switch part 23, whereby switch part 23 also has the components required to drive LEDs 14. It is, however, also possible to integrate circuit 22 so far that it can drive the LEDs directly. Finally, connection 24 with contact points 25 connects push contact 15 to integrated circuit 22.

Signal generator 12 can be made extremely small, whereby however a minimum size will preferably be adhered to so that signal generator 12 and particularly push contact 15 can still be easily operated. One possible size for the top surface of the housing is in the order of 2×3 cm, for instance.

Switching the whole system starts with reversing the interruption in the power supply to signal generator 12 by removing the non-conducting strip 20. Next, push contact 15 is operated, so that integrated circuit 22 is triggered and LEDs 14 transmit the simultaneous previously-determined signals. With infra-red signals, or spatially diverse signals, it is important that LEDs 14 are properly aimed in the direction of the signal receiver 10, with sufficient time having been set, e.g. 30 seconds. After signal receiver 10 detects the simultaneous signals, interruption and/or distortion unit 4 is activated to connect and/or pass the incoming channels undistorted. Here, unit 14 is programmed for how long the channels are to be made available, e.g. 12 or 24 hours.

The foregoing disclosure of embodiments and exemplary applications of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Figure 3:
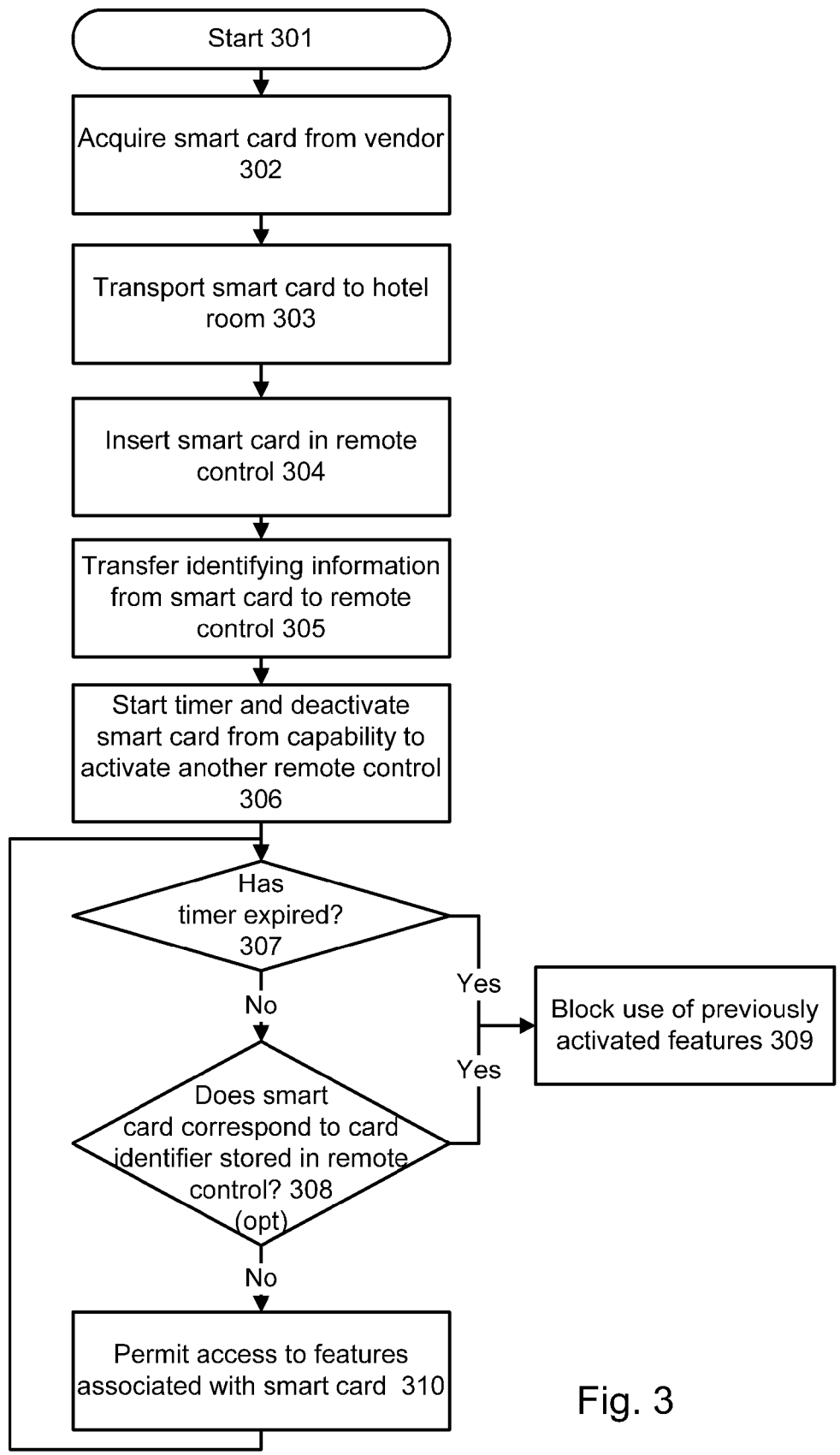
FIG. 3 shows a flowchart of a method in accordance with the present invention.

As shown in FIG. 3, the process starts 301 by a user acquiring a smart card or the like from a vendor 302. Advantageously, there is no specific linkage between the identity of the acquirer and the identification of the smart card acquired, helping to assure privacy. The user then transports the smart card to his or her hotel room 303. Typically, the card will be acquired from guest services in the same hotel, or a vending machine. In some cases, the sale of card may be unlinked from the hotel itself, though in many cases this interferes with the hotel being able to achieve economic benefit. The card may be electronically or mechanically tailored for a specific hotel; for example, a set of grooves in the end of the card, specific for each hotel, may be provided in order to limit use of the cards to a specific hotel, without requiring electronic customization of the cards and their associated remote controls.

The card is inserted into the remote control 304. In some cases, the card is presized similar to a credit card, and is punched out to a smaller size, such as 5×2.3 cm. The remote control, upon detecting insertion of the smart card, transfers identifying information from the smart card to a memory in the remote control 305. A timer is then activated, which limits the duration of authorized access for that card. The smart card is also altered, for example by erasing the authorized duration information 306, so that the card may not be removed and used in a different remote control. If the smart card is thereafter inserted into a different remote control, it will not actuate it, and further, the card may be marked to be inoperative thereafter even when inserted into the original remote control. However, if the card is simply removed from the remote control (in some embodiments), the remote control will be inoperative unless and until the card is reinserted 308 and thereafter the remote will again operate; however, the timer continues to count down 307. In other embodiments, the authorization is transferred from the card to the remote control, and multiple cards (representing different blocks of channels to be authorized) may be simultaneously active. According to one embodiment, if the wrong card is inserted into the remote control, or the timer expires, the previously activated selectively available features are then blocked 309. Certain free access features may remain available, and thus the remote control may be used to activate uncontrolled access features of the television whether or not an authentication token is available.

The receiver device, which is for example a common hotel-type television set, has a programmable controller with firmware stored in flash memory. Typically, hotels employ a somewhat proprietary architecture distinct from the corresponding commercial models, in order to reduce theft and rechanneling of inventory. Typically, each television within a hotel is granted access to all channels on a cable television system implemented within the hotel. On the other hand, the flash memory firmware provides the opportunity to selectively limit access to certain channels. Therefore, limited access content may be present on the cable leading to all rooms and facilities within the hotel, while the receiver programmed to grant or deny access to certain channels or groups of channels. Therefore, a preferred embodiment of the invention provides firmware for the television which limits access to certain channels unless specific codes are received. These channels may be in various groups, each made selectively available based on the smart card inserted in a slot in the remote control. A smart card may authorize composite groups of channels, or separate smart cards may authorize different groups of channels. In the later case, a patron may purchase access to three different groups of channels, and serially insert the cards into the remote control. Each card has its own expiration, and is associated with a separate count down timer. After the corresponding timer within the remote control is activated, the authorization capability for the respective smart card is defeated, for example by "zeroing" the duration register. When the remote control is used to activate the television, it transmits commands which are interpreted by the processor within the television, for example to define the "ring" of channels to be accessed, access channel, navigation within that ring, and to close the "ring" after the operation is completed. By opening and closing the ring as part of an integral sequence of transmissions, the ability of a normal or unauthorized remote control to navigate within the ring is blocked.

What is claimed is:

1. A method for operating a reusable reading device having a signal generator for wirelessly communicating with a signal receiver which authorizes controlled access, the method comprising:

receiving an authentication token device having stored therein a predetermined usage time limit for a predetermined controlled access;

reading the predetermined usage time limit stored in the inserted authentication token device, storing the predetermined usage time limit after a first reading, implementing the predetermined controlled access during the predetermined usage time limit after said first reading, deauthorizing the authentication token device for use with other reading devices by erasing the predetermined usage time limit from the authentication token device based on said first reading, while retaining the ability to read other authentication token devices for other predetermined controlled access, wherein the reading device, after the authentication token device is inserted and removed, does not permit usage for the predetermined controlled access within the predetermined usage limit after said first reading unless the authentication token device is reinserted, and wherein the predetermined usage time limit for the controlled access continues to run from said first reading until expiration of the predetermined usage time limit independently of whether the authentication token device is removed from or reinserted into the reusable reading device during the predetermined usage time limit;

sending, from the signal generator, a wireless transmission to the signal receiver to permit the predetermined controlled access; and upon exceeding the predetermined usage limit after said first reading, deauthorizing the authentication token device for further controlled access.

2. The method according to claim 1, wherein the authentication token device comprises a smart card device having a microprocessor and reprogrammable memory.

3. The method according to claim 1, wherein the reading device comprises a timer, and a memory configured to store an identifier of the read authentication token device, and the predetermined usage limit comprises a duration of permitted usage.

4. The method according to claim 3, wherein the predetermined usage limit further comprises a subset of available channels in a television distribution system.

5. The method according to claim 1, wherein the authentication token device comprises an identification code, and the reading device is configured to read the identification code and transfers it to a memory in the reading device.

6. The method according to claim 1, wherein the reading device comprises a set of user inputs configured to change a program presented from the signal receiver.

7. The method according to claim 1, wherein the reading device comprises a set of user inputs configured to change an audio volume of sounds presented from the signal receiver and to turn on a user presentation output.

8. The method according to claim 1, wherein the reading device transmits a series of commands to the signal receiver for selectively activating controlled access functions.

9. The method according to claim 1, wherein the reading device further is configured to transmit information to the signal receiver which is not subject to access controls.

10. A method for providing controlled access to information through the use of a reusable wireless remote control device having a signal generator and a signal receiver for communicating with a wireless receiver device, the method comprising:

selectively activating a controlled access feature on the wireless remote control device;

transmitting an identifier of the wireless remote control to be stored at the wireless receiver device;

waiting for receipt of a transmitted signal, dependent upon the stored identifier of the reusable wireless remote control, from the wireless receiver device;

if the transmitted signal dependent upon the stored identifier is not received within a predetermined parameter, cancelling an ability of the wireless remote control device to selectively activate the controlled access features;

receiving an authentication token device having stored therein a predetermined usage time limit for a predetermined controlled access;

reading the predetermined usage time limit stored in the inserted authentication token device, storing the predetermined usage time limit after a first reading, implementing the predetermined controlled access during the predetermined usage time limit after said first reading, deauthorizing the authentication token device for use with other wireless remote control devices by erasing the predetermined usage time limit from the authentication token device based on said first reading, while retaining the ability to read other authentication token devices for other predetermined controlled access, wherein the reusable remote control device, after the authentication token device is inserted and removed, does not permit usage for the predetermined controlled access within the predetermined usage limit after said first reading unless the authentication token device is reinserted, wherein the predetermined usage time limit for the controlled access continues to run from said first reading until expiration of the predetermined usage time limit independently of whether the authentication token device is removed from or inserted into the reusable remote control device during the predetermined usage time limit;

transmitting a wireless transmission from the reusable remote control device to the wireless receiver to permit the predetermined controlled access; and upon exceeding the predetermined usage limit, deauthorizing the authentication token for further controlled access.

11. The method according to claim 10, wherein the wireless remote control is adapted to receive an authentication token device comprising a smart card device having a microprocessor and reprogrammable memory, having information stored in the reprogrammable memory representing at least one limit on the controlled access features.

12. The method according to claim 10, wherein the wireless remote control comprises a timer, and the controlled access features comprise a predetermined usage limit stored in a removable information carrier.

13. The method according to claim 12, wherein the predetermined usage limit further comprises a subset of available channels in a television distribution system.

14. The method according to claim 10, wherein the wireless remote control comprises an identification code, which is communicated to a memory in the wireless receiver device.

15. The method according to claim 10, wherein the wireless remote control device comprises a set of user inputs for changing a program presented from the wireless receiver device.

16. The method according to claim 10, wherein the wireless remote control comprises a set of user inputs for changing an audio volume of sounds presented from the wireless receiver device and for turning on a user presentation output.

17. The method according to claim 10, wherein the wireless remote control device transmits a series of distinct commands to the wireless receiver device for selectively activating controlled access functions.

18. The method according to claim 10, wherein the wireless remote control is further adapted to transmit information to the signal receiver which is not subject to access controls.

19. The method according to claim 10, wherein the wireless remote control communicates with the wireless receiver device through at least one modulated infrared optical signal generator.

20. The method according to claim 10, wherein the wireless remote control is activated by insertion of a detachable authorization information carrier, which is deactivated in conjunction with activation of the wireless receiver device by the wireless remote control.

21. The method according to claim 10, wherein the wireless remote control is activated by insertion of a detachable authorization information carrier comprising a cryptographic information processor and an electronic memory.

22. A reusable remote control device for controlling an electronic device for authorized controlled access thereto, comprising:
  (a) a reading device component configured to allow insertion of an authentication token component having stored therein a predetermined usage time limit for a predetermined controlled access, and wherein the reading device is adapted to:
    (i) read the predetermined usage limit for controlled access stored in the authentication token component when inserted, and store the predetermined usage time limit after a first reading,
    (ii) implement the predetermined controlled access during the predetermined usage time limit after said first reading, and
    (iii) deauthorize the authentication token component for use with other remote control devices by erasing the predetermined usage time limit from the authentication token device based on said first reading, while retaining the ability to read other authentication token devices,
    wherein the reading device component after the authentication token device is inserted and removed does not permit usage within the predetermined controlled access within the predetermined usage limit after said first reading unless the authentication token device is reinserted;
  (b) a wireless signal generator adapted to communicate with a signal receiver through a wireless transmission; and
  (c) a processor adapted to continuously implement the predetermined usage time limit for the controlled access until expiration of the predetermined usage time limit after said first reading, wherein the predetermined usage time limit is implemented independently of whether the authentication token device is removed from or inserted into the reading device component during the predetermined usage time limit after said first reading, and upon exceeding the predetermined usage time limit after said first reading, the processor is adapted to deauthorize further controlled access and modify the authentication token component to prevent reuse for further controlled access.

23. A reusable wireless remote control device adapted to control access to information by selectively activating a controlled access feature, the remote control device comprising:

a wireless signal generator configured to communicate with a wireless receiver device through a wireless transmission;
    wherein the signal generator is also configured to transmit an identifier of the wireless remote control to the wireless receiver device;
  a receiver configured to receive a signal dependent upon the stored identifier of the wireless remote control from the wireless receiver device to the wireless remote control;
  a processor configured to determine, if the transmission of the signal dependent upon the stored identifier is not received within a predetermined parameter, and if so, to cancel an ability of the wireless remote control device to selectively activate the controlled access feature, and to implement a duration usage limit after a time of initial activation, to limit an ability to selectively activate the controlled access feature;
  a reading device component configured to allow insertion of an authentication token component having stored therein a predetermined usage time limit for a predetermined controlled access, and wherein the reading device is adapted to:
    (i) read the predetermined usage limit for controlled access stored in the authentication token component when inserted, and store the predetermined usage time limit after a first reading,
    (ii) implement the predetermined controlled access during the predetermined usage time limit after said first reading, and
    (iii) deauthorize the authentication token component for use with other remote control devices by erasing the predetermined usage time limit from the authentication token device based on said first reading, while retaining the ability to read other authentication token devices,
    wherein the reading device component, after the authentication token device is inserted and removed, does not permit usage for the predetermined controlled access within the predetermined usage limit after said first reading unless the authentication token device is reinserted; and
  a processor configured to continuously implement the predetermined usage time limit after said first reading for the controlled access until expiration of the predetermined usage time limit after said first reading independently of whether the authentication token device is removed from or inserted into the reading device component during the predetermined usage time limit after said first reading, and upon exceeding the predetermined usage limit after said first reading, deauthorizing further controlled access and modifying the authentication token component to prevent reuse for further controlled access.

* * * * *